(12) United States Patent
Shikibu

(10) Patent No.: US 11,914,538 B2
(45) Date of Patent: Feb. 27, 2024

(54) SEMICONDUCTOR APPARATUS AND TRANSFER METHOD

(71) Applicant: FUJITSU LIMITED, Kawasaki (JP)

(72) Inventor: Takahiro Shikibu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 172 days.

(21) Appl. No.: 17/352,406

(22) Filed: Jun. 21, 2021

(65) Prior Publication Data

US 2022/0083490 A1  Mar. 17, 2022

(30) Foreign Application Priority Data

Sep. 15, 2020  (JP) .................. 2020-154583

(51) Int. Cl.
*G06F 13/40* (2006.01)
*G06F 12/123* (2016.01)

(52) U.S. Cl.
CPC ........ *G06F 13/4022* (2013.01); *G06F 12/124* (2013.01); *G06F 2212/1044* (2013.01)

(58) Field of Classification Search
CPC .............. G06F 13/4022; G06F 12/124; G06F 2212/1044; G06F 13/1673; H04L 47/10; H04L 47/6215; H04L 47/2441; H04L 47/50; H04L 49/90; H04L 47/24; H04L 47/2433; H04L 47/521; H04L 47/6225; H04L 47/623; H04L 47/805; H04L 67/61; H04L 47/20; H04L 49/9047; H04L 47/2475; H04L 47/2483; H04L 47/6295; H04L 49/3027; H04L 2012/5681; H04L 47/522; H04L 49/3036; H04L 49/508; H04L 49/9036; H04L 49/9052; H04L 1/1835; H04L 1/1874
USPC .... 370/412, 235, 230, 229; 710/29, 52, 240, 710/6, 39
See application file for complete search history.

(56) References Cited

U.S. PATENT DOCUMENTS

| 5,857,110 A | 1/1999 | Sakakibara et al. |
| 5,872,936 A * | 2/1999 | Eckstein ............... G06F 13/364 348/94 |
| 6,104,700 A * | 8/2000 | Haddock ................. H04L 47/10 370/429 |
| 7,020,131 B1 * | 3/2006 | Yun ........................ H04L 49/608 370/386 |
| 7,079,545 B1 * | 7/2006 | Yun ........................ H04L 49/608 370/429 |

(Continued)

FOREIGN PATENT DOCUMENTS

| JP | H06-195313 A | 7/1994 |
| JP | 2002-117003 A | 4/2002 |
| JP | 2005-316609 A | 11/2005 |

*Primary Examiner* — Faisal M Zaman
(74) *Attorney, Agent, or Firm* — Fujitsu Intellectual Property Center

(57) ABSTRACT

A semiconductor apparatus that selects a first packet from a plurality of packets stored in a buffer and transfers the first packet. The semiconductor apparatus switches a plurality of different conditions for grouping the plurality of packets according to a priority order of the plurality of conditions; and selects the first packet from a plurality of packets pertaining to a group extracted on a condition selected by the switching according to a given selecting scheme, and transfers the first packet from the buffer.

13 Claims, 12 Drawing Sheets

(56) References Cited

U.S. PATENT DOCUMENTS

| | | | | |
|---|---|---|---|---|
| 8,099,564 | B1* | 1/2012 | Kulkarni | G06F 13/1673 |
| | | | | 716/136 |
| 8,103,833 | B2* | 1/2012 | Koren | G06F 12/0857 |
| | | | | 710/240 |
| 2002/0069310 | A1* | 6/2002 | Scandurra | G06F 13/362 |
| | | | | 710/240 |
| 2002/0174255 | A1* | 11/2002 | Hayter | H04L 49/901 |
| | | | | 709/250 |
| 2004/0042470 | A1* | 3/2004 | Cooper | H04L 63/1433 |
| | | | | 370/401 |
| 2004/0163084 | A1* | 8/2004 | Devadas | H04L 47/2458 |
| | | | | 718/103 |
| 2006/0018322 | A1* | 1/2006 | Oron | H04L 12/5601 |
| | | | | 370/395.21 |
| 2008/0244133 | A1* | 10/2008 | Riocreux | G06F 13/14 |
| | | | | 710/113 |
| 2009/0271553 | A1* | 10/2009 | Gang | G06F 11/3485 |
| | | | | 710/305 |
| 2009/0307408 | A1* | 12/2009 | Naylor | G06F 13/4022 |
| | | | | 710/317 |
| 2014/0201761 | A1* | 7/2014 | Dalal | H04L 67/1097 |
| | | | | 718/108 |
| 2018/0176330 | A1* | 6/2018 | Ma | H04L 41/0803 |
| 2018/0191629 | A1* | 7/2018 | Biederman | H04L 69/22 |
| 2018/0217951 | A1* | 8/2018 | Benisty | G06F 13/1642 |
| 2018/0367460 | A1* | 12/2018 | Gao | H04L 12/66 |
| 2019/0109793 | A1* | 4/2019 | Dalal | G06F 21/55 |
| 2019/0278523 | A1* | 9/2019 | Benisty | G06F 3/0658 |
| 2020/0145345 | A1* | 5/2020 | Finkelstein | H04L 47/58 |

* cited by examiner

FIG.8

A1,B1,G1,H1 at time t=0
C1,D1,E1,F1,A2,B2,G2,H2 at time t=1
Cn,Dn,En,Fn,An+1,Bn+1,Gn+1,Hn+1 at time t=n
WHEN PACKETS ARE CONTINUOUSLY INPUT

NORMAL LRU

CYC:3 : A0
CYC:4 : E0
CYC:5 : C0
CYC:6 : F0
CYC:7 : D0
CYC:8 : G0
CYC:9 : B0
CYC:10 : E1
CYC:11 : C1
CYC:12 : F1
CYC:13 : D1
CYC:14 : H0
...
CYC:243 : A20
CYC:244 : E40
CYC:245 : C40
CYC:246 : F40
CYC:247 : D40
CYC:248 : G20
CYC:249 : B20
CYC:250 : E41
CYC:251 : C41
CYC:252 : F41
CYC:253 : D41
CYC:254 : H20

LPU PRIORITY : DP PRIORITY =1:1

CYC:3 : A0
CYC:4 : E0
CYC:5 : C0
CYC:6 : G0
CYC:7 : B0
CYC:8 : F0
CYC:9 : D0
CYC:10 : H0
...
CYC:155 : A19
CYC:156 : E19
CYC:157 : C19
CYC:158 : G19
CYC:159 : B19
CYC:160 : F19
CYC:161 : D19
CYC:162 : H19
CYC:163 : A20
CYC:164 : E20
CYC:165 : C20
CYC:166 : G20
CYC:167 : B20
CYC:168 : F20
CYC:169 : D20
CYC:170 : H20

EXAMPLE OF OUTPUT OF ABCDEFGH-TX

SEMICONDUCTOR APPARATUS AND TRANSFER METHOD

CROSS-REFERENCE TO RELATED APPLICATION

This application is based upon and claims the benefit of priority of the prior Japanese Patent application No. 2020-154583, filed on Sep. 15, 2020, the entire contents of which are incorporated herein by reference.

FIELD

The embodiment discussed herein is directed to a semiconductor apparatus and transfer method.

BACKGROUND

In a computer systems such as a High-Performance Computing (HPC), multiple computer nodes (hereinafter sometimes simply referred to as "nodes") may be communicably connected to each other via a network, and the multiple nodes may be operated in parallel.

In addition, in an LSI having multiple cores (nodes), called multi-core or many-core, in a single CPULSI, in other words, in a semiconductor chip, a network-on-chip is known as a configuration in which the multiple cores are connected via a network. The term "CPULSI" is an abbreviation for Central Processing Unit Large Scale Integration.

In the network-on-chip, prioritization is performed, considering bus-path collisions between Point to Point (P2P) communications between cores. Assuming that the network-on-chip has an arbitration circuit (arbiter) that performs unfair arbitration between cores, arbitration in the arbitration determining circuit may cause deadlocks, livelocks in the cores, for example.

As a solution to the above, in the network-on-chip, a bus prioritization circuit using a fair arbiter using a Least Recently Used (LRU) allows data, e.g., packets, sent from the multiple cores to sequentially use the bus, for example.

[Patent Document 1] Japanese Laid-open patent Publication No. 2005-316609
[Patent Document 2] Japanese Laid-open patent Publication No. 2002-117003
[Patent Document 3] Japanese Laid-open patent Publication No. HEI 6-195313

SUMMARY

According to one aspect of an embodiment, a semiconductor apparatus may select a first packet from a plurality of packets stored in a buffer and transfer the first packet. The semiconductor apparatus may switch a plurality of different conditions for grouping the plurality of packets according to a priority order of the plurality of conditions. Further, the semiconductor apparatus may select the first packet from a plurality of packets pertaining to a group extracted on a condition selected by the switching according to a given selecting scheme, and transfer the first packet from the buffer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of packets selected by ABCDEFGH-TX in each of a case where arbitration using an ordinary LRU is performed and a case where arbitration of an algorithm using an arbitration circuit is performed.

DESCRIPTION OF EMBODIMENT(S)

Figure 1:
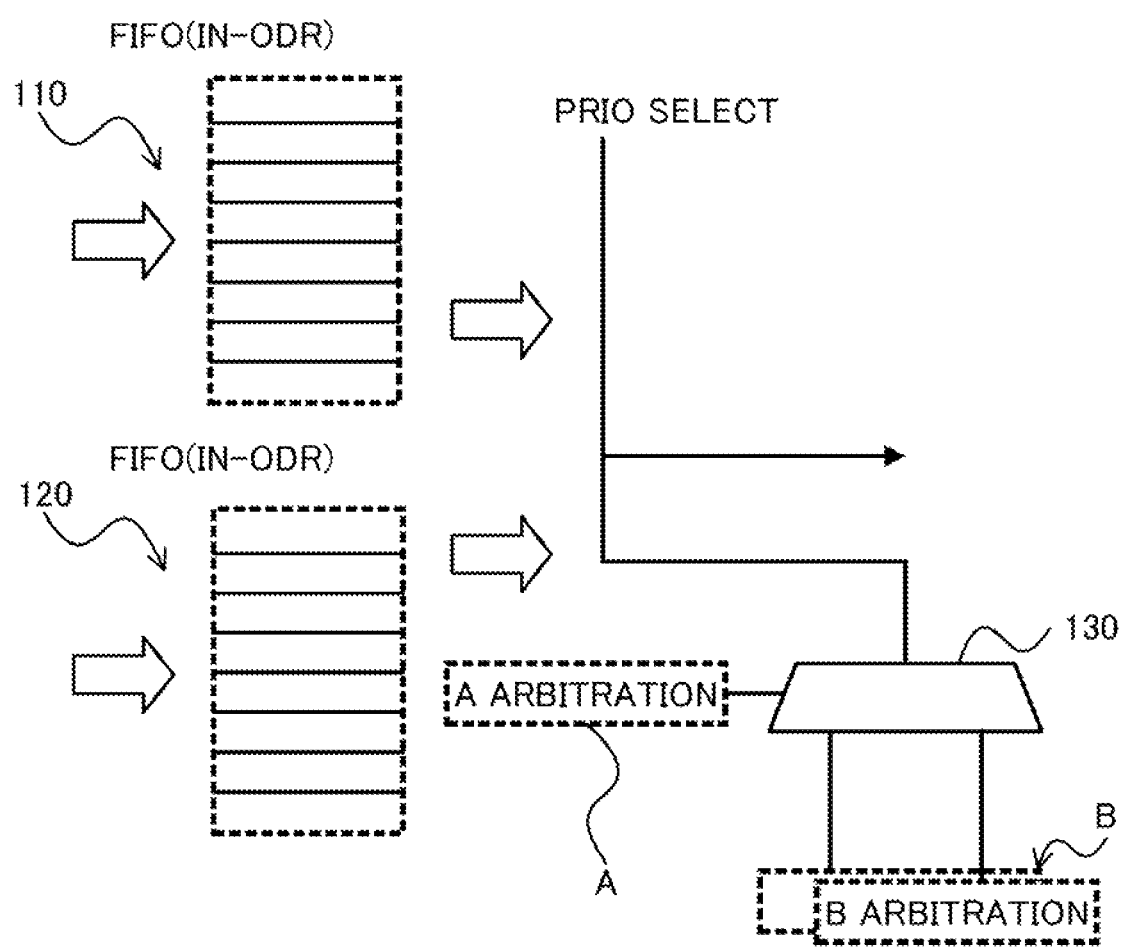
FIG. 1 is a diagram illustrating an example of an arbitration process according to a comparative example.

In providing an arbitration circuit to a circuit that operates on the order of several GHz and undergoes a multi-layer packet merging, an attempt to create a fair circuit considering all packet types and routes may complicate the circuits for decoding, selection, and other purposes, and may fail in obtaining performance exceeding the specified operating frequency.

For example, when an arbitration circuit that arbitrates by grouping certain types or certain paths is configured to abate the complexity of the circuit, some cases in certain circumstances may result in unfair arbitration determinations. In cases where the computer system executes a program that executes all processes cooperatively (e.g., in synchronization with one another), such unfairness in the arbitration determination may degrade the processing performance of the entire system, for example.

As the above, a circuit which fairly and sequentially selects multiple packets and transfers the selected packets may deviate the selected packets and lower the processing velocity of the system.

The above description made in relation to a network between the cores, and the same is applied to other networks. For example, in cases where a network that communicably connects CPUs to each other includes a circuit that fairly and sequentially selects packets transmitted from each of the CPUs and transfers the selected packets, the selected packets may be deviated and the processing velocity of the system may lower.

Hereinafter, an embodiment of the present invention will now be described with reference to the accompanying drawings. However, the embodiment described below is merely illustrative and is not intended to exclude the application of various modifications and techniques not explicitly described below. For example, the present embodiment can be variously modified and implemented without departing from the scope thereof. In the drawings to be used in the following description, the same reference numbers denote the same or similar parts, unless otherwise specified.

[1] One Embodiment

[1-1] Comparative Example

FIG. 1 is a diagram illustrating an example of an arbitration process according to a comparative example. As illustrated in FIG. 1, data, exemplified by packets, of arbitration targets to be transmitted from a sender (may also be referred to as a "source") such as a core are stored in First In-First Out (FIFOs) 110 and 120.

When an arbitration circuit 130 arbitrates packets to be output from the FIFOs 110 and 120, the arbitration circuit 130 selects (determines) packets by prioritizing arbitration from the viewpoint of A (i.e., A arbitration, see reference symbol A) and then arbitration from the viewpoint of B (i.e., B arbitration, see reference symbol B). The term "viewpoint" may mean one or both of an element and a condition, such as a delay, and a packet type, of a packet used to select (determine) a packet in arbitration.

Thus, in the arbitration circuit 130, the higher priority of arbitration is given in the order of the A arbitration and the B arbitration. Since the LRU fairly selects packets in both the arbitration A and the arbitration B, it can be said the packets are fairly selected by a constant algorithm.

In the example of FIG. 1, when arbitration is viewed from another "viewpoint", the packets to be arbitrated may be distributed, and the processing performance of a system may be lowered by some applications executed by the system.

Incidentally, although the order can be guaranteed also by the FIFOs and occurrence of deadlock or livelock in the core, for example, may be able to avoid, the LRU can expect an effect of enhancement of the performance as a result of fair arbitration, and therefore the following description assumes that the LRU is used.

[1-2] Example of Configuration of One Embodiment

Figure 2:
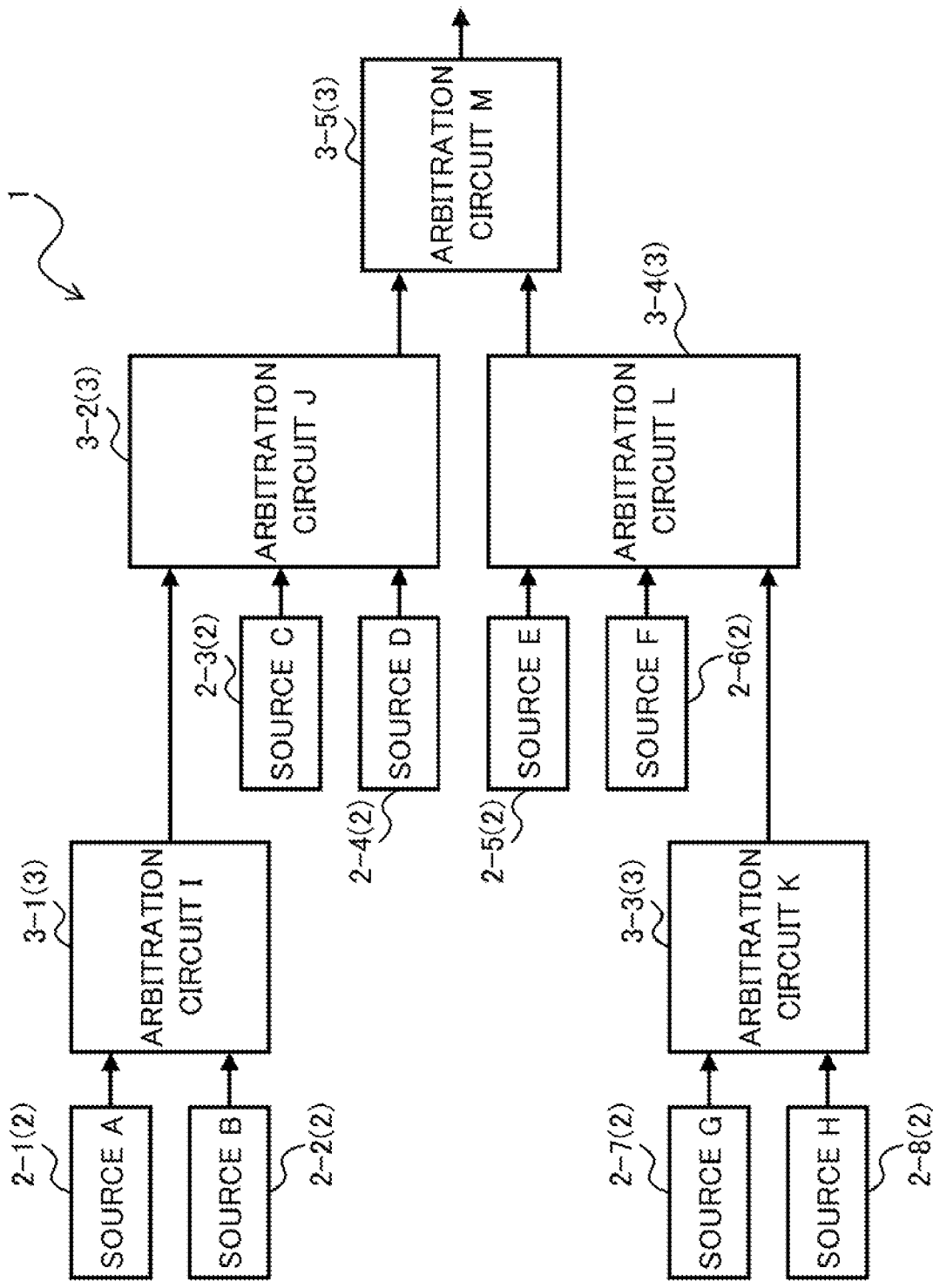
FIG. 2 is a block diagram illustrating an example of a configuration of a system of an embodiment.

FIG. 2 is a block diagram illustrating an example of the configuration of a system 1 according to one embodiment. The system 1 is an exemplary computer system that establishes communication between multiple cores, and may be achieved by one or more semiconductor chips exemplified by CPULSIs.

Focusing on the control of the communication between the multiple cores such as a control of packet routing, the system 1 illustratively may include multiple (eight in FIG. 2) sources 2-1 to 2-8 and multiple (five in FIG. 2) arbitration circuits 3-1 to 3-5. In FIG. 2, illustration of some of components and connection lines (linkages) of the system 1 are omitted for the sake of convenience.

Hereinafter, when not being distinguished from one another, the sources 2-1 to 2-8 are denoted to be the sources 2, and also when not being distinguished from one another, the arbitration circuits 3-1 to 3-5 are denoted to be the arbitration circuits 3. In addition, as illustrated in FIG. 2, the sources 2-1 to 2-8 may be denoted to be sources A to H, respectively, and the arbitration circuits 3-1 to 3-5 may be denoted to be arbitration circuits I to M, respectively.

Each source 2 is an example of a sender of data, e.g., packets. Examples of the source 2 are a variety of devices capable of outputting (transmitting or transferring) data, such as a core of a processor, the arbitration circuit 3, and a communication device.

Each arbitration circuit 3 is an example of a semiconductor apparatus that selects a packet from multiple packets stored in a buffer and transfers the selected packet. An example of the arbitration circuit 3 may be an integrated circuit such as a crossbar bus implemented in a semiconductor chip.

For example, the arbitration circuit 3 may include at least two input terminals (not illustrated), and an output terminal (not illustrated). To each of the at least two input terminals and the output terminal, one of the source 2 and the arbitration circuit 3 may be connected. In the arbitration circuit 3, a packet received at the input terminal be selected in an arbitration process in the arbitration circuit 3, and the selected packet may be output from the output terminal.

Hereinafter, packets output from the sources A to H may be denoted as packets A to H, respectively, and selected packets output from the arbitration circuits 3-1 to 3-5 may be denoted as packets I to M, respectively.

In the example of FIG. 2, the arbitration circuit I arbitrates the sources A and B and outputs a packet I. Hereinafter, packets I to M, which are outputs from the arbitration circuits 3, may be expressed by arranging the reference symbols of the packets to be arbitrated in the respective arbitration circuits 3 side by side. For example, the packet I which is the output of either one of the packets A and B of the arbitration targets may be referred to as a "packet AB".

[1-3] Example of Functional Configuration

Figure 3:
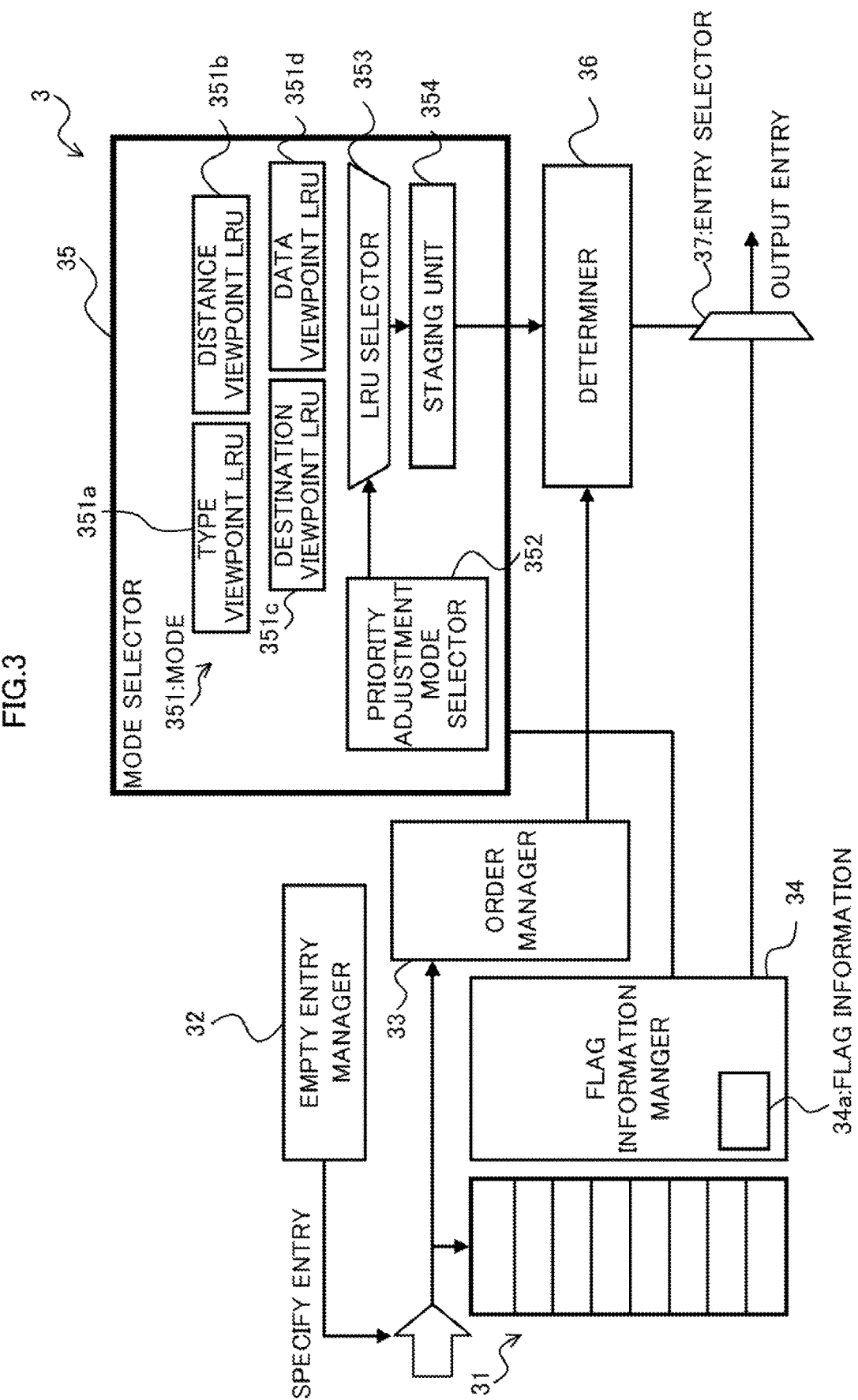
FIG. 3 is a block diagram illustrating an example of a functional configuration of an arbitration circuit of the embodiment.

FIG. 3 is a block diagram illustrating an example of the functional configuration of the arbitration circuit 3 of the embodiment. Each of the arbitration circuits 3-1 to 3-5 illustrated in FIG. 2 may include the functional configuration of the arbitration circuit 3 illustrated in FIG. 3, or some of the arbitration circuits 3-1 to 3-5 may include the functional configuration. The following description assumes that, for example, the arbitration circuit 3-5 includes the functional configuration exemplified in FIG. 3.

As illustrated in FIG. 3, the arbitration circuit 3 may illustratively include, as the functional configuration, a memory 31, an empty entry manager 32, an order manager 33, a flag information manager 34, a mode selector 35, a determiner 36, and an entry selector 37.

The functional configuration that the arbitration circuit 3 includes may be implemented, for example, by a logical circuit. By way of example, the arbitration circuit 3 may be implemented by a Programmable Logic Device (PLD), such as a Field Programmable Gate Array (FPGA). The PLD such as the FPGA is an example of a reconfigurable logical circuit. Incidentally, the arbitration circuit 3 may be implemented by, in place of the PLD, a logical circuit such as an Application Specific Integrated Circuit (ASIC).

The memory 31 is an example of the buffer that stores packets input into the arbitration circuit 3. For example, the memory 31 may include multiple entries and store an inputted packet in any empty entry of the multiple entries. For example, the memory 31 may store packets inputted from the multiple input terminals of the arbitration circuit 3, as inputs of the arbitration circuit 3, into empty entries.

An example of a method of storing entries in the memory 31 is a variety of methods, such as methods using MAP or SET, that can obtain a packet from a specified entry regardless of the order of being stored unlike FIFO method. The memory 31 may be achieved by a logical circuit such as a Static Random Access Memory (SRAM).

The empty entry manager 32 manages empty entries in the memory 31. For example, when the arbitration circuit 3 receives a packet, the empty entry manager 32 may store the received packet into an empty entry among the entries in the memory 31 by specifying the empty entry.

The order manager 33 stores the order in which the packets are stored into the entries in the memory 31. For example, the order manager 33 may identify an entry in the memory 31 into which entry a packet is to be stored on the basis of information of an entry specified by the empty entry manager 32.

The flag information manager 34 manages flag information 34a, which is exemplary specific data of a packet. For example, the flag information manager 34 may store the flag information 34a of packets one stored in each of the multiple entries in the memory 31. A storage area to store the flag information 34a in the flag information manager 34 may be achieved by means of, for example, a logical circuit such as the SRAM.

Figure 4:
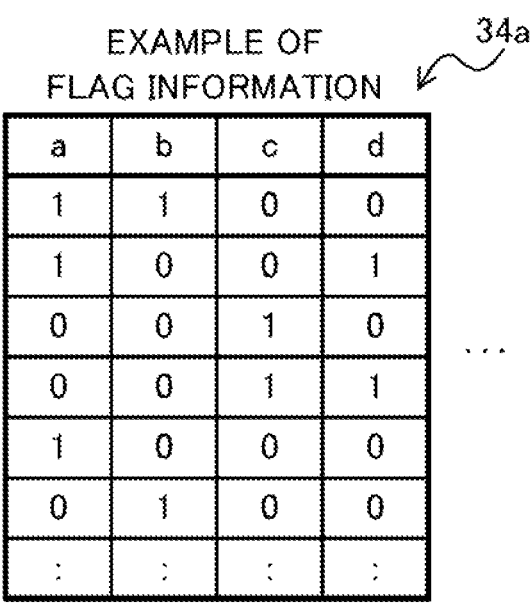
FIG. 4 is a diagram illustrating an example of flag information stored in a flag information manager.

FIG. 4 is a diagram illustrating an example of flag information 34a stored in the flag information manager 34. As illustrated in FIG. 4, the flag information 34a may include one or more items per mode 351 described below, for example. In the example of FIG. 4, the items corresponding to the respective mode 351 are represented by "a" to "d", for convenience. Each of the items "a" to "d" corresponds to the reference symbols 351a to 351d of FIG. 3, respectively.

As illustrated in FIG. 4, the flag information 34a may include a flag for each item for each entry in the memory 31. The flag is an example of information of multiple information types obtained from each packet. For example, the flag is an example of information indicating whether or not a packet stored in an entry pertains to a group corresponding to the mode 351. In the example of FIG. 4, in the first entry in the memory 31, the flags corresponding to the items "a" and "b" of the mode 351 are set to ON (e.g., "1"). This indicates that the packet in the first entry pertains to the group corresponding to the items "a" and "b" of the mode 351.

Here, a packet includes information corresponding to the flag information 34a at the header section, the data section, or the entire part. For the above, the flag information manager 34 may include, as the flag information 34a, a logic for referring to information from, for example, the header section, the data section, or the entire part of a packet stored in an entry in the memory 31. For example, the flag information manager 34 may provide, as the flag information 34a, the mode selector 35 with a logic for referring to information, such as the destination of the header section, the presence or absence of the data section, the size of the packet, from the entry.

The mode selector 35 forms multiple flag groups of different types based on the flag information 34a for each entry managed by the flag information manager 34, determines the priorities in each flag group, and selects the mode 351. For example, the mode selector 35 may set modes 351 of different viewpoints for each flag group.

The mode selector 35 may include multiple (four in the example of FIG. 3) modes 351, a priority adjustment mode selector 352, an LRU selector 353, and a staging unit 354, as illustrated in FIG. 3.

Each of the multiple modes 351 is an example of a condition (rule) for grouping the flag information 34a that the packets have into flag groups. The multiple modes 351 are different in the flag information 34a that the modes 351 focus on when grouping the multiple packets into flag groups. In other words, it can be said that the multiple modes 351 each group the multiple packets according to information of type among information of multiple different types obtained from each of the multiple packets. As the above, the multiple modes 351 groups packets stored in the buffer from different viewpoints. Each of the multiple modes 351 may be implemented, for example, in the form of a logical circuit as a logic of the LRU.

The multiple modes 351 may include, for example, a type viewpoint LRU 351a, a distance viewpoint LRU 351b, a destination viewpoint LRU 351c, a data viewpoint LRU 351d, and the like. Incidentally, the modes 351 are not limited to the examples described above, and alternatively may be used LRUs of various viewpoints. For example, the modes 351 may include a simple LRU, in other words, a mode that turns ON the flags for all packets.

The flag information manager 34 makes it possible to select a flag group from an entry in the memory 31 in each of these modes 351 by generating the flag information 34a based on the inputted packets.

The type viewpoint LRU 351a relates to a flag group according to the type of packets, e.g., "OPCODE". The use of the type viewpoint LRU 351a can reduce the instruction deviation between packets selected by arbitration. In the type viewpoint LRU 351a, flag groups of one or both of the viewpoints of "request" and "response" are used on the basis of "OPCODE" or the like, for example. The viewpoint "request" may use, for example, the flag information 34a of the viewpoint of each function, each ID (Load)/ST (Store), or the like. The viewpoint "response" may use, for example, the flag information 34a of the viewpoint of a direction of a core, a direction of a memory controller, or the like.

The distance viewpoint LRU 351b relates to a flag group according to one or both of the distance that a packet travels to reach the arbitration circuit 3 and the distance that a packet travels to reach the destination. The use of the distance viewpoint LRU 351b can alleviate unfairness between packets caused by the senders (e.g., "from") of the packets. In the distance viewpoint LRU 351b, packet sorting based on the flag information 34a may be performed in any one or more of the viewpoints (i) to (iv) below.

(i) The distance viewpoint LRU 351b accomplishes the class sorting of packets by establishing a range according to the number (hop number) of circuits, such as the arbitration circuits 3, that a packet has passed until reaching the arbitration circuit 3.

(ii) The distance viewpoint LRU 351b accomplishes the class sorting of packets by establishing a range according to the number (hop number) of circuits, such as the arbitration circuits 3, that a packet has passed until reaching the destination.

(iii) The distance viewpoint LRU 351b accomplishes the class sorting (classification) of packets on the basis of a combination of the above (i) and (ii) that increases (e.g., maximizes) the performance of the system 1 using the pattern recognition model, such as a Support Vector Machine (SVM) that sets the above (i) and (ii) to the two axes.

(iv) The distance viewpoint LRU 351b accomplishes the class sorting (classification) of packets by using a calculating expression that sets the above (i) and (ii) to the two axes and that is based on a given linear programming.

Figure 5:
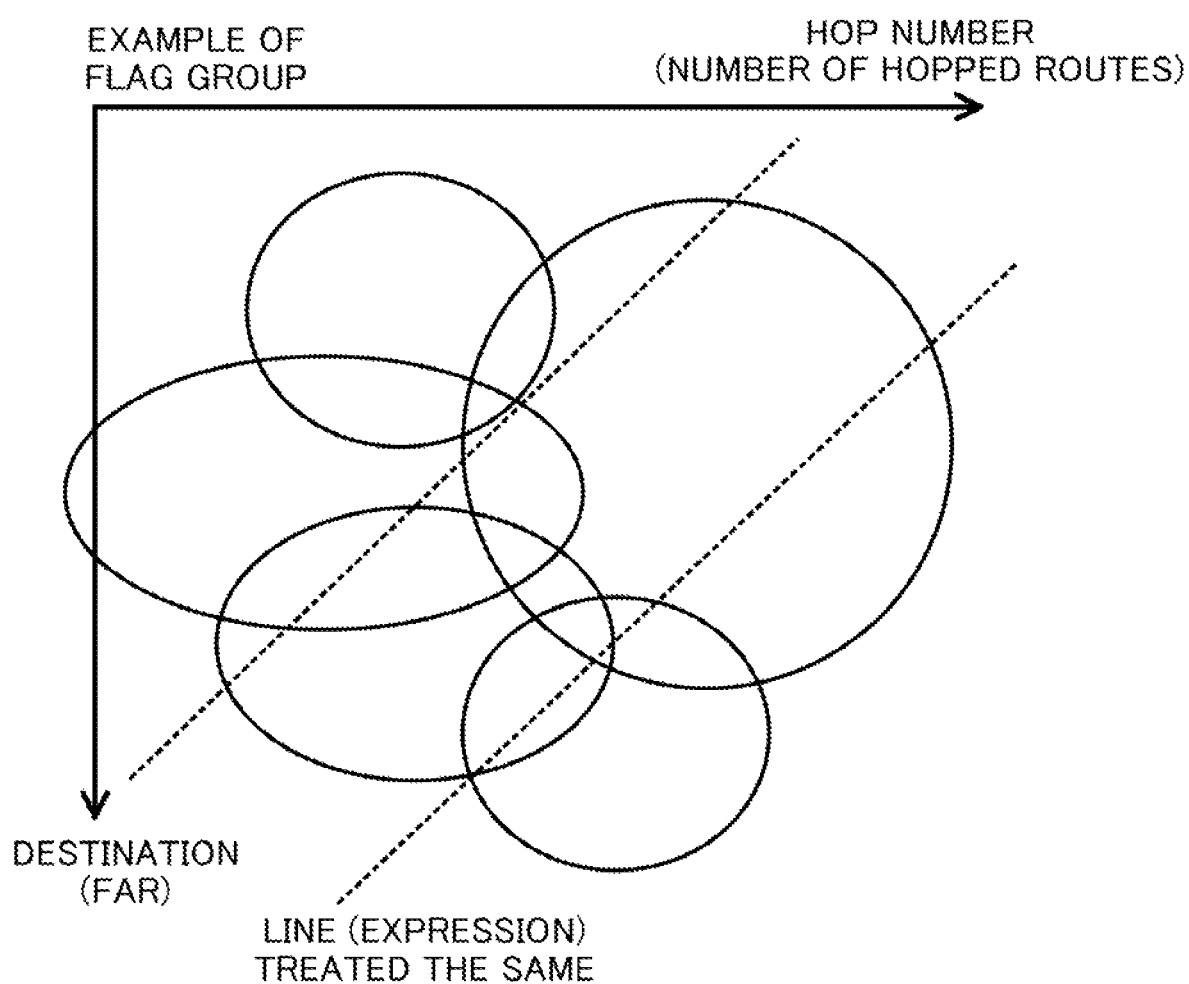
FIG. 5 is a diagram illustrating a distance viewpoint LRU.

FIG. 5 is a diagram illustrating the distance viewpoint LRU 351b. The distance viewpoint LRU 351b may accomplish, for example, class sorting (classification) of packets for each region partitioned by "lines treated the same" (in the example of FIG. 5, indicating two different "lines") expressed in a calculating expression based on the given linear programming in the above (iv). In the example of FIG. 5, each ellipse is a region indicating the distribution of the flag information 34a of the packets.

The destination viewpoint LRU 351c relates to a flag group according to the destinations of packets. The use of the destination viewpoint LRU 351c can suppress the concentration of the destinations of the packets selected by arbitration toward one node direction, so that the outputted packets can be distributed. In the destination viewpoint LRU 351c, flag groups grouped from the viewpoints of one or both of the next transfer destinations (next hops) of packets and the destinations (arrival destinations) of packets are used, for example.

The data viewpoint LRU 351d relates to a flag group according to one or both of the data of the destinations of the packets and the data sizes of the packets. The data viewpoint LRU 351d can reduce a deviation in costs for data transfer in the arbitration circuits 3. In the data viewpoint LRU 351d, flag groups grouped from one or more of the following viewpoints (v) to (viii) are used, for example.

(v) Whether or not a packet contains data (e.g., the presence or the absence of a data section).

(vi) The size of the data (e.g., the size of the data section or the overall size).

(vii) Whether or not the packet is a packet for control.

(viii) Whether or not the packet is a packet for cache (whether or not the packet is the data to be reused).

The priority adjustment mode selector 352 may include an algorithm for switching and selecting one of the multiple modes 351 at a given timing. The algorithm is an example of a priority selection algorithm that selects the priority of each packet to be transferred. An example of the given timing is a constant time period (a given interval, e.g., a transfer cycle of a single packet) in terms of time share (time division), but is not limited thereto. Alternatively, the timing may be a timing based on the various parameters that the arbitration circuit 3 can be obtained.

Figure 6:
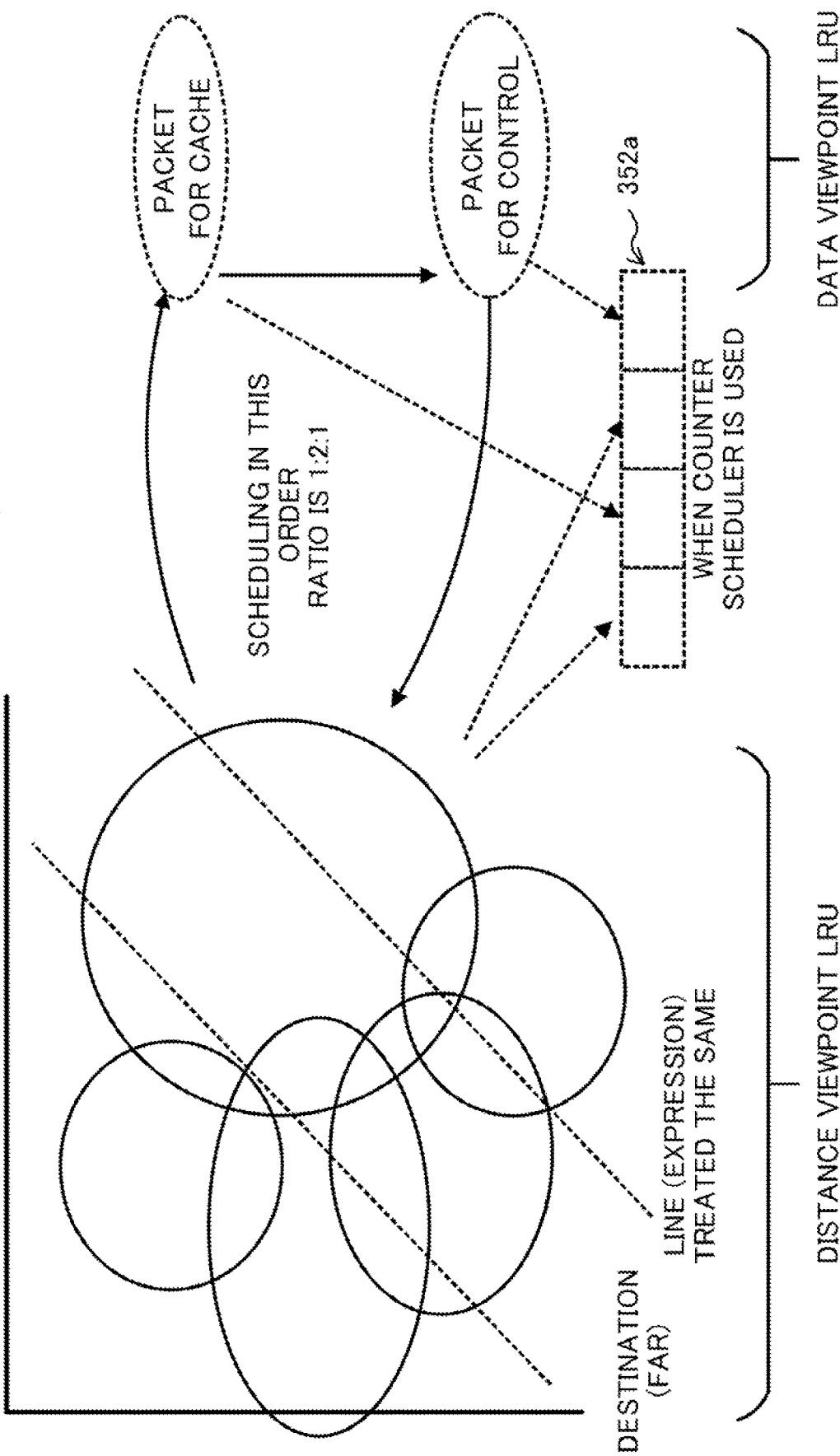
FIG. 6 is a diagram illustrating a selection process for a mode by a priority adjustment mode selector.

FIG. 6 is a diagram illustrating an example of a selection process for the mode 351 by the priority adjustment mode selector 352. In the illustration of FIG. 6, the priority adjustment mode selector 352 is assumed to switch the priority from the following viewpoints (I) to (III) in terms of time sharing.

(I) The priority from the viewpoint of the above (iv) in the distance viewpoint LRU 351b.

(II) The priority from the viewpoint of the above (vii) in the data viewpoint LRU 351d.

(III) The priority from the viewpoint of the above (viii) in the data viewpoint LRU 351d.

In the example of FIG. 6, the priority adjustment mode selector 352 may include an algorithm that schedules of the selection at the continuous ratio of (I):(II):(III)=2:1:1 such that the ratio of selecting (I) comes to be higher than the respective ratios of selecting (II) and (III).

As illustrated in FIG. 6, in cases where the algorithm of the priority adjustment mode selector 352 utilizes time sharing, the priority adjustment mode selector 352 may further include, for example, a counter scheduler 352a. In the example of FIG. 6, the priority adjustment mode selector 352 sets the modes 351 into the counter scheduler 352a in the order of (I), (II), (I), (III), (I), (II), (I), (III) . . . .

The priority adjustment mode selector 352 may prepare multiple algorithms for having multiple patterns of selecting the mode 351 as the above. The algorithms having multiple patterns may be set when the system 1 or the arbitration circuit 3 is implemented into the semiconductor chip.

The priority adjustment mode selector 352 may select, for example, an algorithm to be used according to the application (program) into be executed by the system 1. By way of example, the priority adjustment mode selector 352 may select an algorithm that the priority adjustment mode selector 352 determines to be capable of maintaining fairness between packets on the basis of the nature of the application and the characteristics of the respective modes 351 described above, in other words, an algorithm determined to be capable of enhancing the performance of the system 1.

As the above, the priority adjustment mode selector 352 switches two or more modes 351 among the multiple modes 351 according to an algorithm matching the program executed in the arbitration circuit 3 among one or more algorithms that switch the two or more modes 351.

For example, the algorithm may be selected in advance (e.g., set at the time of implementation) for each application or may be set by an user of the system 1 determining that the algorithm is suitable from the aspect of the characteristic of the application. Alternatively, an algorithm that can be predicted to enhance the performance from the statistic of a characteristic of the application through learning of a pattern recognition model such as SVMs by deep learning may be selected. Implementation of the selecting function for the algorithm using deep learning may be achieved, for example, when the system 1 or the arbitration circuit 3 is implemented into the semiconductor chip, or may be set by the user.

The LRU selector 353 selects an entry in the flag group corresponding to the selected mode 351 on the basis of the mode 351 selected by the priority adjustment mode selector 352 and the flag information 34a that the flag information manager 34 stores.

The staging unit 354 adjusts the output of the result of the selection by the LRU selector 353, for example, adjusts the output timing. The staging unit 354 may be implemented, for example, in the form of a Flip Flop (FF) circuit.

As described above, the mode selector 35 is an example of a switching unit that switches multiple different conditions for grouping the multiple packets according to a priority order of each of the multiple conditions.

The determiner 36 determines the oldest packet (entry) that the order manager 33 manages among the entries in the flag group output from the mode selector 35, which means packets selected by the mode selector 35 and flagged. For example, the determiner 36 may determine the oldest entry that the order manager 33 manages among the entries in the selected flag group according to a given selecting scheme, e.g., the LRU.

The entry selector 37 selects an entry determined by the determiner 36 from among the multiple entries in the memory 31 and outputs the packet stored in the selected entry. For example, the entry selector 37 may send a packet stored in the entry determined by the determiner 36, as the output from the arbitration circuit 3, through the output terminal of the arbitration circuit 3 to the subsequent circuit.

As described above, the order manager 33, the determiner 36, and the entry selector 37 collectively serve as an example of a transfer unit that selects a packet from multiple packets pertaining to a group extracted on a condition selected by the switching in a given selecting scheme, and transfers the selected packet from the buffer.

In the arbitration circuit 3 illustrated in FIG. 3, for example, the multiple algorithms of the priority adjustment mode selector 352 may be adjustable after a chip as the arbitration circuit 3, in other words, a semiconductor apparatus including at least the arbitration circuit 3 is formed (configured). An example of a method of adjusting the algorithms is rewriting the logic of the FPGA. The logic to be rewritten is, for example, scheduling, the modes 351, and a priority order.

With this adjustment, even in certain situations where the arbitration algorithm is hard-coded and is therefore unable to be treated, such a programmable arbitration determining algorithm can treat the hard-coding, suppressing the complicating the circuit. For example, when a particular program is executed in the system 1, adjusting the priority adjustment algorithm can later adjust the factors causing unfairness of the buses, which is a cause of degrading the performance. This allows the arbitration circuit 3 to determine the extent of prioritizing a higher-priority packet, so that the arbitration circuit 3 can operate as a fair circuit considering the priorities.

[1-4] Example of Operation

Figure 7:
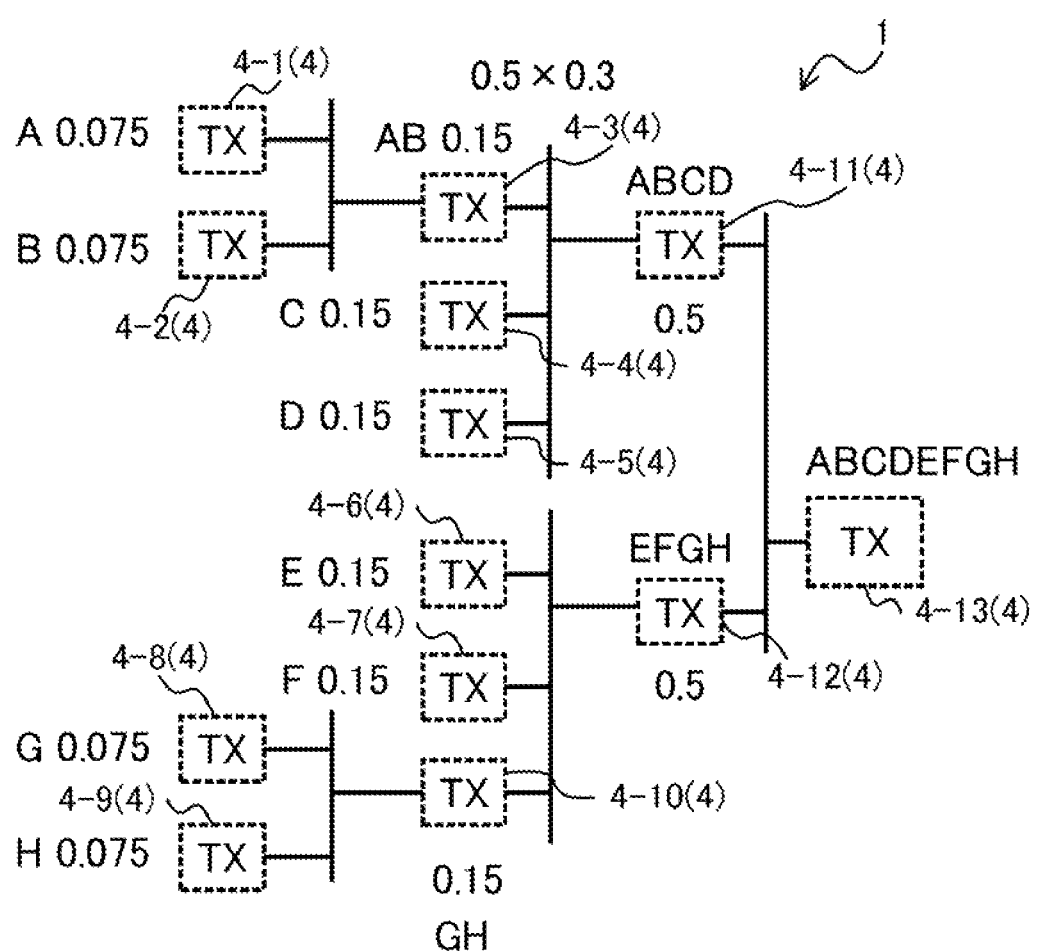
FIG. 7 is a diagram illustrating an example of an operation of an arbitration circuit of the embodiment.

FIG. 7 is a diagram illustrating an example of an operation of the arbitration circuit 3 of the embodiment. FIG. 7 illustrates an exemplary operation in the arbitration circuit 3-S of the system 1 illustrated in FIG. 2.

In FIG. 7, TXs (Transmitters) 4-1 to 4-13 (simply referred to as TXs 4 when not distinguishing TXs 4-1 to 4-13 from one another) represent circuits that output packets and are exemplified by the sources 2 or the arbitration circuits 3 illustrated in FIG. 2. In FIG. 7, the DPs (Deep Numbers) below the TXs 4 is a flag that indicates a depth of an outputting source of a packet as viewed from TX 4-13 corresponding to the arbitration circuit 3-5. A larger the DP represents that the corresponding TX 4 is positioned at a deeper layer (i.e., further in distance) from the TX 4-13.

The alphabet attached to each TX 4 represents a packet that the TX 4 outputs. For example, the packet M (see FIG. 2) outputted by the arbitration circuit 3-5 corresponds to the packet ABCDEFGH outputted by the TX 4-13 in FIG. 7. The packet ABCDEFGH is a packet of the selected from packets A to H, as described above.

In addition, the numeric values attached to each TX 4 indicate a ratio of selection of a packet when an ordinary LRU algorithm, starting at the TX 4-13 is used. In the example of FIG. 7, the ratio of selection for the TX 4 of the merge source may be set to a value obtained by proportionally dividing the ratio of selection for the TX 4 by the number of merges in this TX 4 in the sequence of from DP=1 to DP=3 on the assumption that the ratio of selection in the TX 4-13 is "1.0". For example, the ratio of selection of the packet C with DP=2 is "0.15", and the ratio of selection of the packet A with DP=3 is "0.075". In the system 1, which has large distances between the TXs 4 and has an asymmetric tree structure, the use of the ordinary LRU algorithm causes the TX 4 having a larger DP to have a smaller the ratio of selection of a packet.

The arbitration circuit 3 according to the embodiment, for example, in the arbitration circuit 3-5 (TX 4-13), arbitrates so as to fairly treat all the TXs 4 using the following algorithm.

For example, the arbitration circuit 3 may use an algorithm that switches between LRU priority and DP priority at a ratio of 1:1 in time sharing. The LRU priority is a simple LRU, and is exemplified by the mode 351 in which packets are selected in order of arrival in the TX 4-13. The DP priority is, for example, the mode 351 in which a packet having a larger DP value serving as a flag is selected in preference to a packet having a smaller value of DP. For example, in the DP priority, the mode selector 35 of the arbitration circuit 3 selects one or more entries (e.g., an entry with DP=3) with the largest DP in the flag group, and the determiner 36 selects the oldest entry among the selected entries according to the LRU.

For example, the mode selector 35 sets the mode 351 into the counter scheduler 352a in the order of the LRU priority, the DP priority, the LRU priority, the DP priority . . . .

FIG. 8 is a diagram illustrating an example of packets selected by the TX 4-13 (indicated by "ABCDEFGH-TX") each of a case where arbitration using the ordinary LRU is performed and a case where arbitration using the algorithm using the arbitration circuit 3 is performed. In FIG. 8, the subscripts 1 to n+1 (where n is an integer equal to or larger than two) attached to the reference symbols A to H of the packet indicate which place in order the packet has output from the sender of the packets. Further, in FIG. 8, the term "CYS" represents a cycle.

As illustrated in FIG. 8, in the arbitration using the ordinary LRU, the ratio of cases where the packets A, B, G, and H are selected is about the half the ratio of cases where the packets C, D, E and F are selected, as illustrated in FIG. 7.

On the other hand, in the arbitration using the algorithm, i.e., arbitration setting the ratio between the LRU priority and the DP priority=1:1, in the TX 4-13, all the TXs 4 are fairly treated and consequently all the packets A to H are selected at the same ratio. As described above, the arbitration circuit 3 according to the embodiment can achieve fair arbitration by applying an appropriate priority selection algorithm according to the connection relationship of the buses in the application, the system 1, and the like. Therefore, it is possible to suppress a decrease in the processing performance of the system 1, which includes the arbitration circuit 3 for arbitrating multiple packets.

[1-5] Example of Hardware Configuration

Figure 9:
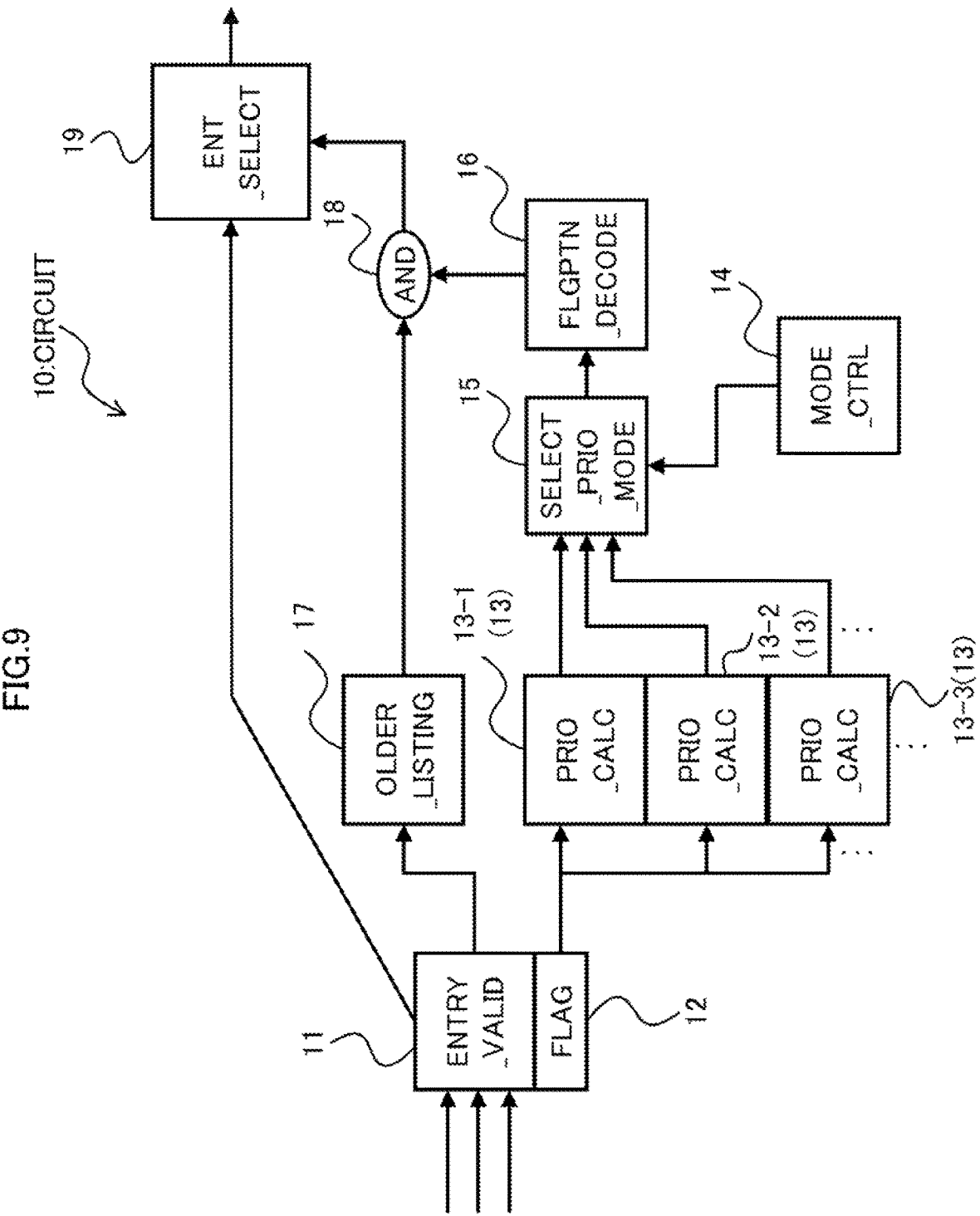
FIG. 9 is a block diagram illustrating an example of a hardware (HW) configuration of a circuit serving an example of the arbitration circuit.

FIG. 9 is a block diagram illustrating an example of a hardware (HW) configuration of a circuit 10 serving an example of the arbitration circuit 3. The circuit 10 may be formed to be an integrated circuit, in other words, a semiconductor apparatus, by, for example, the PLD such as the FPGA, or the ASIC.

As illustrated in FIG. 9, the circuit 10 may illustratively include an ENTRY_VALID 11, a FLAG 12, PRIO_CALCs 13-1 to 13-3, a MODE_CRL, 14, a SELECT_PRIO_MODE 15, a FLGPTN_DECODE 16, an OLDER_LISTING 17, an AND 18, and an ENT_SELECT 19. Hereinafter, when not being distinguished from one another, the PRIO_CALCs 13-1 to 13-3 are simply referred to as PRIO_CALC(s) 13. The number of PRIO_CALCs 13 may be two or less or four or more.

The ENTRY_VALID 11 is a circuit that includes multiple entries and stores an inputted packet into an empty entry among the multiple entries. The memory 31 and the empty entry manager 32 illustrated in FIG. 3 may be achieved by the ENTRY_VALID 11.

The FLAG 12 is a circuit for referring to, a storage area that stores a flag for grouping each of the multiple entries for each PRIO_CALC 13 or the flag, from the ENTRY_VALID 11. The flag information manager 34 illustrated in FIG. 3 may be achieved by the FLAG 12.

Each PRIO_CALC 13 is a circuit that calculates the flag of the FLAG 1.2 and the priority. For example, each of the PRIO_CALCs 13-1 to 13-3 groups (i.e., form groups) the entries of the FLAG 12 according to the same PRIO_CALC 13 and calculates the priority (PRIO) of the group. The mode 351 illustrated in FIG. 3 may be achieved by the PRIO_CALC 13.

The MODE_CTRL 14 is a circuit that makes the user possible to programmably control the operation of the arbitration circuit 3 later (e.g., after the HWs are implemented). In other words, the MODE_CTRL 14 is an example of a circuit that achieves at least one of changing one or more algorithms and adding a new algorithm after the arbitration circuit 3 is configured. For example, the MODE_CTRL 14 schedules the selection for the PRIO_CALCs 13, determines the priorities of the PRIO_CALCs 13, and the like, and reflects the result of the scheduling and the determining in the SELECT_PRIO_MODE 15.

The SELECT_PRIO_MODE 15 is a circuit that selects one of the multiple PRIO_CALCs 13. For example, the SELECT_PRIO_MODE 15 may select the PRIO_CALC 13 on the basis of the scheduling, the priorities, and the like determined by the MODE_CTRL 14.

The FLGPTN_DECODE 16 is a circuit that decodes the flag pattern of the PRIO_CALC 13 selected by the SELECT_ PRIO_MODE 15.

The priority adjustment mode selector 352, the LRU selector 353, and the staging unit 354 illustrated in FIG. 3 may be achieved by the MODE_CTRL 14, the SELECT_PRIO_MODE 15, and the FLGPTN_DECODE 16, respectively.

The OLDER_LISTING 17 is a circuit that manages an entry list representing the order of storing packets into the ENTRY_VALID 11 (for example, the order of packets from the oldest storing timing). The order manager 33 illustrated in FIG. 3 may be achieved by the OLDER_LISTING 17.

The AND 18 is a circuit that compares (for example, by calculating a logical product of) the flag pattern decoded by the FLGPTN_DECODE 16 with the entry list managed by the OLDER_LISTING 17, and outputs information of an entry matching both the flag pattern and the entry list. In other words, the AND 18 outputs information of an entry that matches the flag pattern among the entries (according to the LRU) managed by the OLDER_LISTING 17. The determiner 36 illustrated in FIG. 3 may be achieved by the AND 18.

The ENT_SELECT 19 is a circuit that selects, from the ENTRY. VALID 11, a packet of the entry associated with the information of the entry output from the AND 18 and outputs the selected packet. The entry selector 37 illustrated in FIG. 3 may be achieved by the ENT_SELECT 19.

Figure 10:
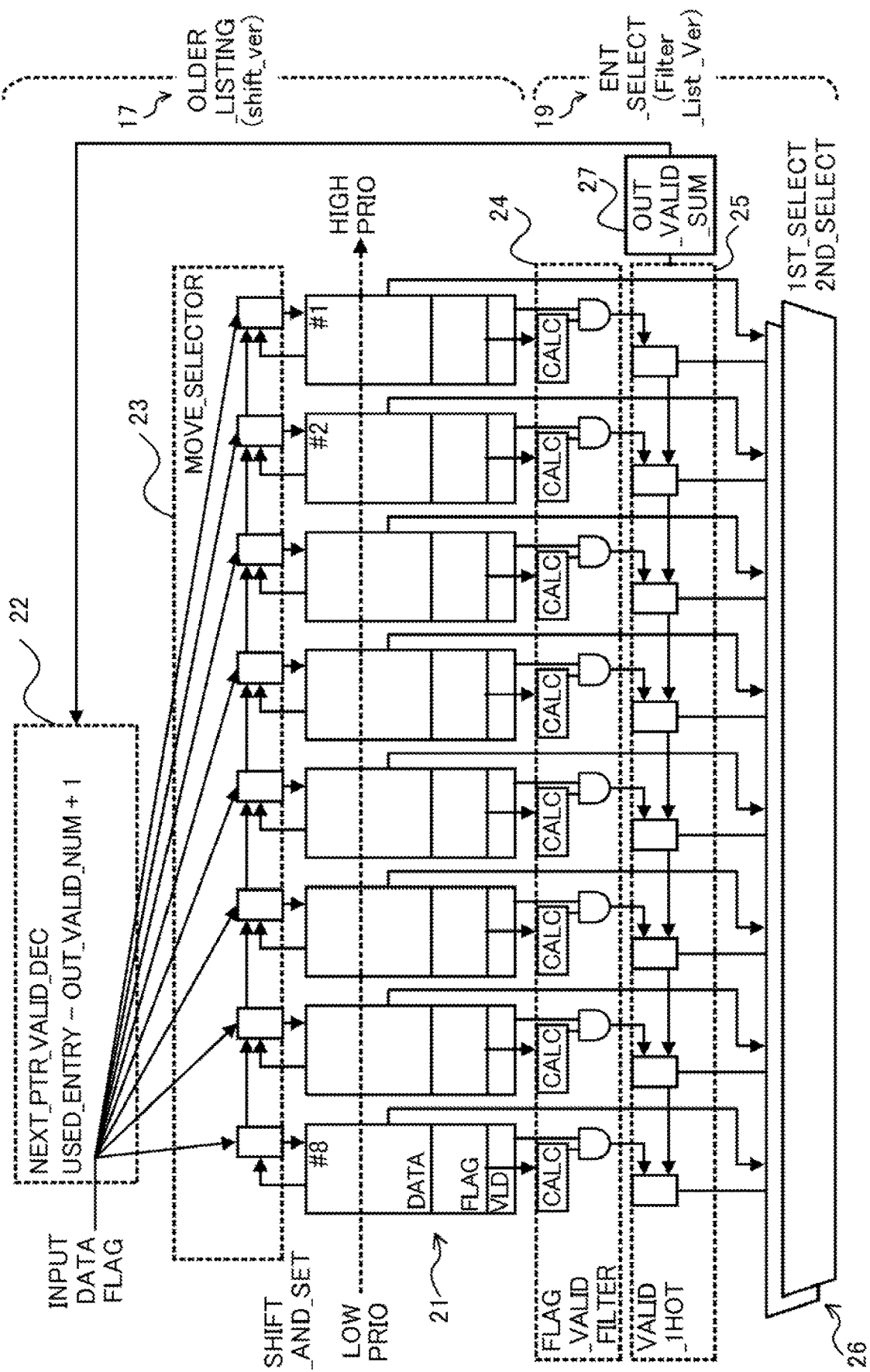
FIG. 10 is a block diagram schematically illustrating an example of a HW implementation of a circuit including an OLDER_LISTING and an ENT_SELECT illustrated in FIG. 9.

FIG. 10 is a block diagram illustrating an example of a HW implementation of a circuit including the OLDER_LISTING 17 and the ENT_SELECT 19 illustrated in FIG. 9. FIG. 10 briefly illustrates an example of the HW implementation of the circuit including the OLDER_LISTING 17 and the ENT_SELECT 19. The HW configuration of the arbitration circuit 3 is not limited to this, and the actual arbitration circuit 3 may have different in configuration and processing of the HW implementation from the above.

For example, the OLDER_LISTING 17 may be implemented as a circuit of a bubble-up scheme. The bubble-up scheme is a buffering scheme in which, when a certain entry comes to be empty due to data retrieval or movement under a state where the priority order of the entries are fixed, data is sequentially moved to the empty entries from the entry having the next priority so that entries are stored in order of higher priorities.

For example, the OLDER_LISTING 17 may include slots 21, a NEXT_PTR_VALID_DEC 22, and a MOVE_SELECTOR 23.

The slots 21 may each include a storage area storing DATA, FLAG, and VLDs (VALID) and may be provided as many as the number of entries. The FLAG may correspond to the flag in the flag information 34a. The slots 21 are assumed to be given higher priorities (HIGH PRIO) as approaching the right side of the drawing of FIG. 10, for example. An example of data having a higher priority may be data having an older storage order (data corresponding to the LRU). The storage area of each slot 21 may be at least a part of the ENTRY_VALID 11 and the FLAG 12, for example.

The NEXT_PTR_VALID_DEC 22 registers data into an entry defined by the following.

(the number of current entries)−[the number of outputs from the entries in the current cycle]+1
(further +1 when the input ID is 2ND).

Here, the arbitration circuit 3 may support multiple inputs (INPUTs) and/or multiple outputs (OUTPUTs). For example, [the number of outputs from the entries in the current cycle] may be 2 in cases where the current cycle treats two outputs as illustrated in FIG. 10.

The MOVE_SELECTOR 23 selects the point where to the data is input in accordance with the NEXT_PTR_VALID_DEC 22. In addition, it is assumed that the entries are extracted in the order of "PRIO" but the extraction is allowed to skip some entries. The MOVE_SELECTOR 23 may shift a certain entry at a certain time point by the number of entries having higher priorities (HIGH PRIO) than the certain entry and being skipped from the extraction in the HIGH PRIO direction.

The ENT_SELECT 19 may be implemented as a circuit of a ripple-carry scheme, for example. For example, the ENT_SELECT 19 may include a FLAG_VALID_FILTER 24, a VALID_1HOT 25, one or more (two in FIG. 10) selectors 26, and an OUT_VALID_SUM 27.

The FLAG_VALID_FILTER 24 calculates a logical product (AND) of the information of the FLAG and the VLD (Valid flag information; requirement condition) from any of the entries in the slot 21.

The VALID_1HOT 25 filters the VLD and outputs the result of the filtering as an enable signal (ENB) of the selector. For example, the VALID_1HOT 25 sets an ENB for the certain entry ON in cases where the VLD of every entry with the higher priority than the certain entry is not ON. Seen from the reverse viewpoint, the VALID_1HOT 25 sets the VLD of a certain entry to OFF when an entry whose VLD is ON is present in the HIGH PRIO direction of the certain entry.

The one or more (two in FIG. 10) selectors 26 output DATA of each entry of the slot 21, which entry associated with an ENB output from the VALID_1HOT 25, from the arbitration circuit 3. For example, each selector 26 may output packets in the order of the 1ST_SELECT and the 2ND_SELECT.

The one or more selectors 26 (for example, the 2ND_SELECT, the 3RD_SELECT (not illustrated), . . . ) except for the 1ST_SELECT refrains from outputting an entry selected by the prior selector 26 to the selectors 26 per se.

For example, if the 2ND_SELECT and the 3RD_SELECT are provided, the FLAG_VALID_FILTER 24 and the VALID_1HOT 25 may be provided for each selector 26. In this case, the respective VALID_1HOTs 25 associated with the 2ND_SELECT and the 3RD_SELECT set the ENB of the certain entry to OFF so as not to set the ENB of the entry selected in the prior selector(s) 26 to the selectors 26.

The OUT_VALID_SUM 27 obtains [the number of outputs from the entries in the current cycle] from the VALID_1HOT and notifies the obtained value to the NEXT_PTR_VALID_DEC 22.

As described above, the HW configuration illustrated in FIG. 10 makes it possible to make determination of "selected conditions"×"oldest entry".

According to the system 1 (arbitration circuit 3) of the embodiment described above, switching of the priority selection algorithm can deal with certain situations such as particular operations of an application. For example, in cases where the application is a benchmark, the system 1 can obtain a bus characteristic specialized for the benchmark.

The PLD such as the FPGA makes it possible to customize the operation of the arbitration circuit 3 for a particular customer by rewritably providing any one or more of the FLAG 12, the PRIO_CALCs 13, and the MODE_CTRL 14 (see FIG. 9) to the user. An example of customizing the operation of the arbitration circuit 3 may include allowing the user to select the method for counting the flag groups. Additionally, allowing addition or change of the priority selection algorithm of the arbitration circuit 3 can provide a risk-hedge against possible performance impairment.

Figure 11:
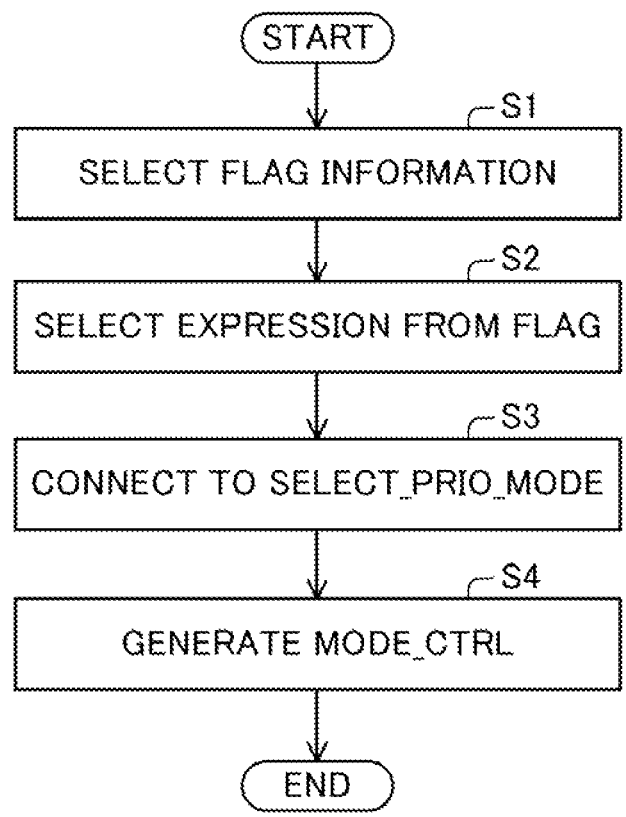
FIG. 11 is a flowchart illustrating an example of an operation of an implementation process of the arbitration circuit.
Figure 12:
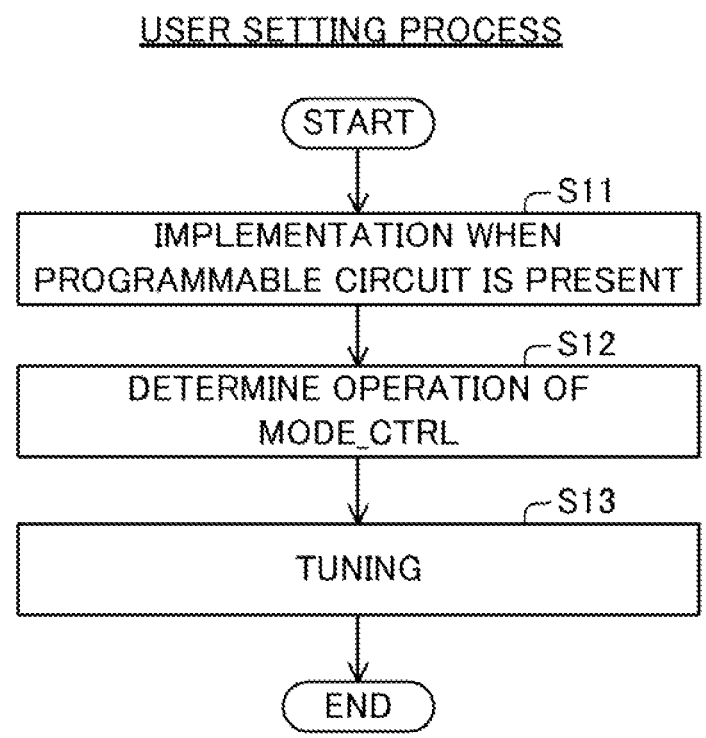
FIG. 12 is a flowchart illustrating an example of an operation of a user setting process.

[1-6] Examples of Implementation Process of Arbitration Circuit and User Setting Process Next, referring to FIGS. 11 and 12, description will now be made in relation to an example of an operation of an implementation process to implement the system 1 according to the embodiment, for example, the arbitration circuit 3, and an example of an operation of a user setting process. FIG. 11 is a flowchart illustrating the example of the operation of the implementation process of the arbitration circuit 3, and FIG. 12 is a flowchart illustrating the example of the operation of the user setting process.

[1-6-1] Implementation Process:

As illustrated in FIG. 11, in the implementation of the arbitration circuit 3 exemplified by at least one of design and implementation, the operator selects information of the FLAG 12 (Step S1). For example, as items provided in the flag information 34*a*, information of the various FLAGS 12 that can be obtained from packets of, for example, FROM, TO, DISTANCE, PKT-OPCD may be selected.

Further, the operator selects the calculation expression from the FLAG 12 (Step S2). For example, in Step S2, one or more circuits to which expressions suitably used for sorting of flag groups according to the modes 351, conversion of the priority (PRIO) evaluation into numeric value, for example, are applied may be generated.

For example, in Steps S1 and S2, the logic of at least part of the FLAG 12 and the PRIO_CALCs 13 illustrated in FIG. 9 may be generated.

Each PRIO_CALC 13 is connected to the SELECT_PRIO_MODE 15 by the operator (Step S3).

The MODE_CTRL 14 is generated by the operator so that the user can select the circuit later (Step S4). Incidentally, in cases where the configuration of the arbitration circuit 3 at the time of the implementation is fixed, the generation of the MODE_CTRL 14, in other words, the process of Step S4, may be omitted.

The remaining HW configurations may each be appropriately implemented before or after any of the Steps S1 to S4.

In addition to the MODE_CTRL 14, the process may instruct the user to generate the FLAG 12, the PRIO_CALCs 13, or the like. In this case, the process from Step S2 (or S1) to Step S3 may be omitted.

The arbitration circuit 3 of the embodiment can be implemented in the above manner.

[1-6-2] User Setting Process:

As illustrated in FIG. 12, in cases where the arbitration circuit 3 includes a programmable circuit, the operator or the user implements a user setting region after the arbitration circuit 3 is implemented (Step S11).

The user determines the operation of the MODE_CTRL 14 (Step S12), and makes the setting. For example, the user may determine parameters such as the scheduling of the priority selection algorithm, the modes 351, and the priority order based on the flag pattern that collects the flags described in the operation specification of the arbitration circuit 3, and reflect the parameters in the MODE_CTRL 14.

For example, a constraint that "the flag pattern to be set in the setting MODE_CTRL 14 covers all the flag patterns" may be set for the setting in the MODE_CTRL 14. This constraint aims at ensuring that packets are grouped without any drop (or grouped in multiple combinations without any drop) for each viewpoint.

After that, tuning of the above parameters is made by the user (Step S13). In the tuning, the parameters may be adjusted by using a benchmark or the like, such that the priority selection algorithm can enhance the processing performance, for example. Alternatively, the turning is dynamically made by using software such as Artificial Intelligence (AI).

The user setting may be made on the arbitration circuit 3 of the embodiment in the above manner.

[2] Miscellaneous

The technique according to the embodiment described above can be implemented after modifying or changing as follows.

For example, the functions of the blocks 31 to 37 provided to the arbitration circuit 3 illustrated in FIG. 3 may be merged in any combination and may each be divided.

Further, as the given selecting scheme, the LRU is used, but is not limited thereto. For example, since the arbitration circuit 3 executes the balancing also mixedly considering the LRUs, a logic that preferentially selects data of a packet having a larger DP value (i.e., the deeper in output source of a packet) may be set in some of the modes 351 (the PRIO_CALCs 13), for example. As an example, a logic that selects only packets having DP values equal to or greater than a given value among multiple packets may be set in some of the modes 351 (PRIO_CALCs 13).

In one aspect, it is possible to suppress degrading of the processing performance of the system which includes a circuit for arbitrating multiple packets.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A semiconductor apparatus that selects a packet from a plurality of packets stored in a buffer and transfers the packet, the semiconductor apparatus being configured to:
select, among a plurality of extraction patterns, a first extraction pattern at a selection ratio according to priorities set one for each the plurality of extraction patterns, the plurality of extraction patterns being defined to extract, based on information of one or more types included in a plurality of types, one or more packets from the plurality of packets stored in the buffer, the information of one or more types being selected from among a plurality of pieces of information of the plurality of types, the plurality of pieces of information being obtained for each of the plurality of packets and being different from one another;
select a first packet from one or more packets extracted in the first selected extraction pattern according to a given selecting scheme, and transfer the first packet from the buffer;
select a second extraction pattern among the plurality of extraction patterns according to the selection ratio, the second extraction pattern extracting, based on information of one or more types being included in the plurality of types and being different from the information used by the first extraction pattern, one or more packets from the plurality of packets stored in the buffer; and
select a second packet from one or more packets extracted in the second extraction pattern according to the given selecting scheme, and transfer the second packet from the buffer.

2. The semiconductor apparatus according to claim 1, wherein the plurality of extraction patterns each group the plurality of packets according to the information of one or more types among the plurality of pieces of information obtained from each of the plurality of packets.

3. The semiconductor apparatus according to claim 1, wherein the semiconductor apparatus switches two or more extraction patterns of the plurality of extraction patterns according to an algorithm matching a program executed in the semiconductor apparatus among one or more algorithms that switch the two or more extraction patterns.

4. The semiconductor apparatus according to claim 3, comprising a circuit that achieves at least one of changing the one or more algorithms and adding a new algorithm after the semiconductor apparatus is configured.

5. The semiconductor apparatus according to claim 4, wherein the circuit is a reconfigurable logical circuit.

6. The semiconductor apparatus according to claim 1, wherein the selected extraction pattern is switched among the plurality of extraction patterns at given intervals.

7. The semiconductor apparatus according to claim 1, wherein the given selecting scheme is a Least Recently Used (LRU) scheme.

8. A transfer method by a semiconductor apparatus that selects a packet from a plurality of packets stored in a buffer and transfers the packet, the transfer method comprising:
selecting, among a plurality of extraction patterns, a first extraction pattern at a selection ratio according to priorities set one for each the plurality of extraction patterns, the plurality of extraction patterns being defined to extract, based on information of one or more types included in a plurality of types, one or more packets from the plurality of packets stored in the buffer, the information of one or more types being selected from among a plurality of pieces of information of the plurality of types, the plurality of pieces of information being obtained for each of the plurality of packets and being different from one another;
selecting a first packet from one or more packets extracted in the first selected extraction pattern according to a given selecting scheme, and transferring the first packet from the buffer;
selecting a second extraction pattern among the plurality of extraction patterns according to the selection ratio, the second extraction pattern extracting, based on information of one or more types being included in the plurality of types and being different from the information used by the first extraction pattern, one or more packets from the plurality of packets stored in the buffer; and
selecting a second packet from one or more packets extracted in the second extraction pattern according to the given selecting scheme, and transferring the second packet from the buffer.

9. The transfer method according to claim 8, wherein the plurality of extraction patterns each group the plurality of packets according to the information of one or more types among the plurality of pieces of information obtained from each of the plurality of packets.

10. The transfer method according to claim 8, further comprising switching two or more extraction patterns of the plurality of extraction patterns according to an algorithm matching a program executed in the semiconductor apparatus among one or more algorithms that switch the two or more extraction patterns.

11. The transfer method according to claim 8, further comprising switching the selected extraction pattern among the plurality of extraction patterns at given intervals.

12. The semiconductor apparatus according to claim 1, wherein the second extraction pattern extracts, based on the information of one or more types used by the second extraction pattern, the one or more packets from the plurality of packets stored in the buffer after the first packet being transferred.

13. The transfer method according to claim 8, wherein the second extraction pattern extracts, based on the information of one or more types used by the second extraction pattern, the one or more packets from the plurality of packets stored in the buffer after the first packet being transferred.

* * * * *